Oct. 29, 1940.   R. B. PARKER   2,219,430
TEMPERING APPARATUS
Filed July 30, 1937   4 Sheets-Sheet 1
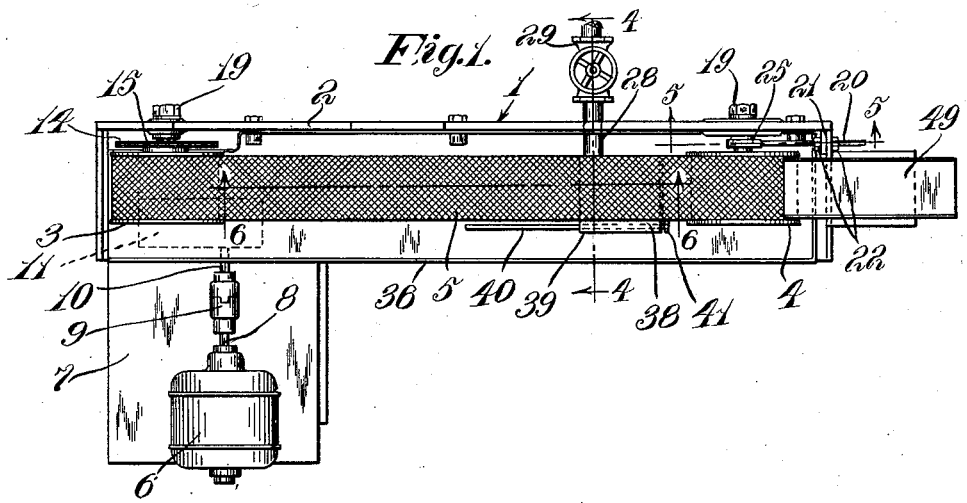
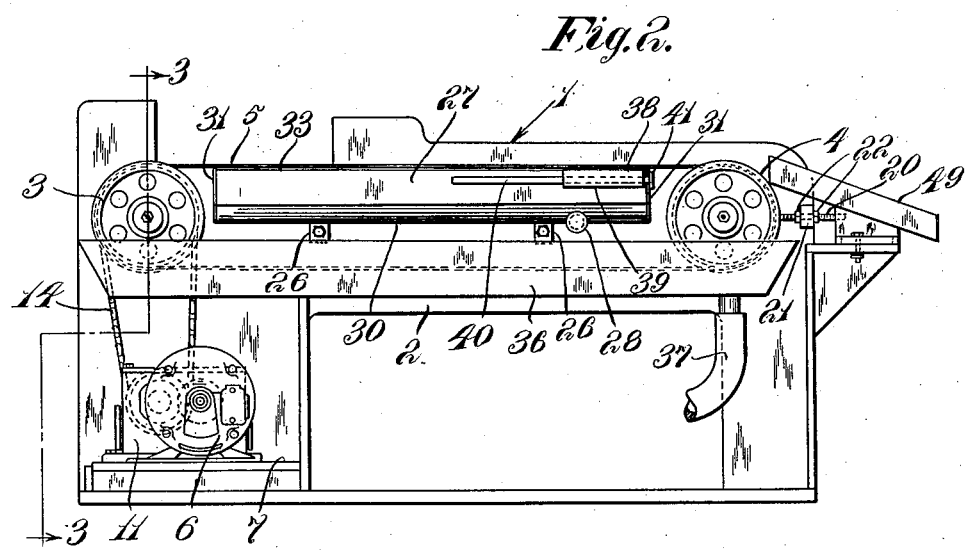
Inventor:
Robert B. Parker.
by Louis A. Maxson
Atty.

Oct. 29, 1940.  R. B. PARKER  2,219,430
TEMPERING APPARATUS
Filed July 30, 1937 4 Sheets-Sheet 2
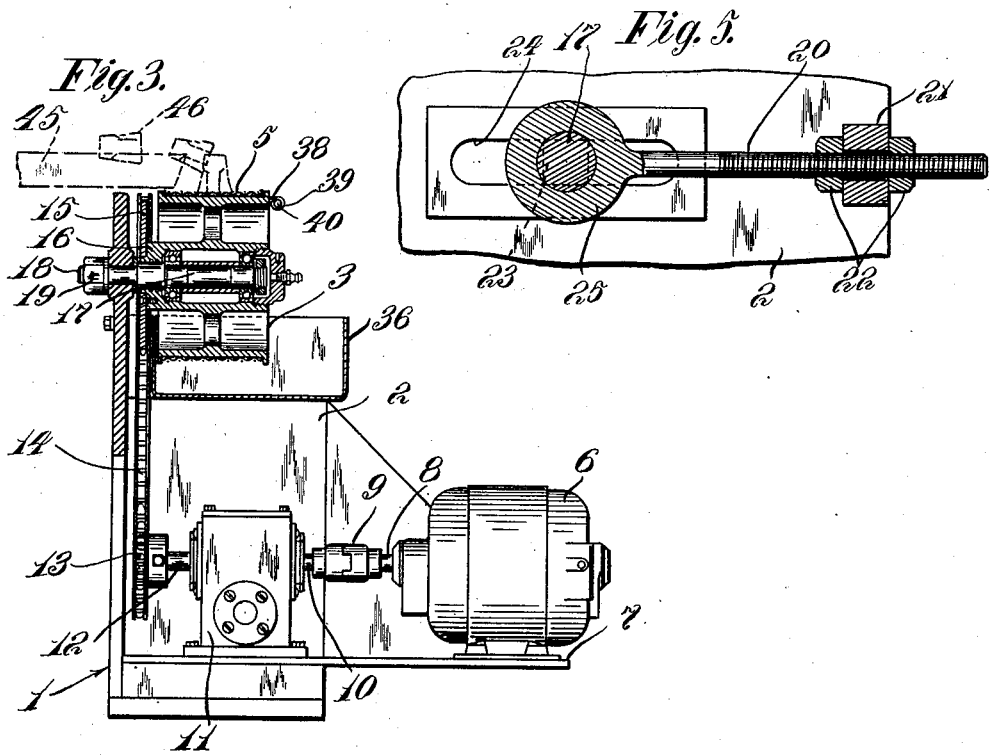
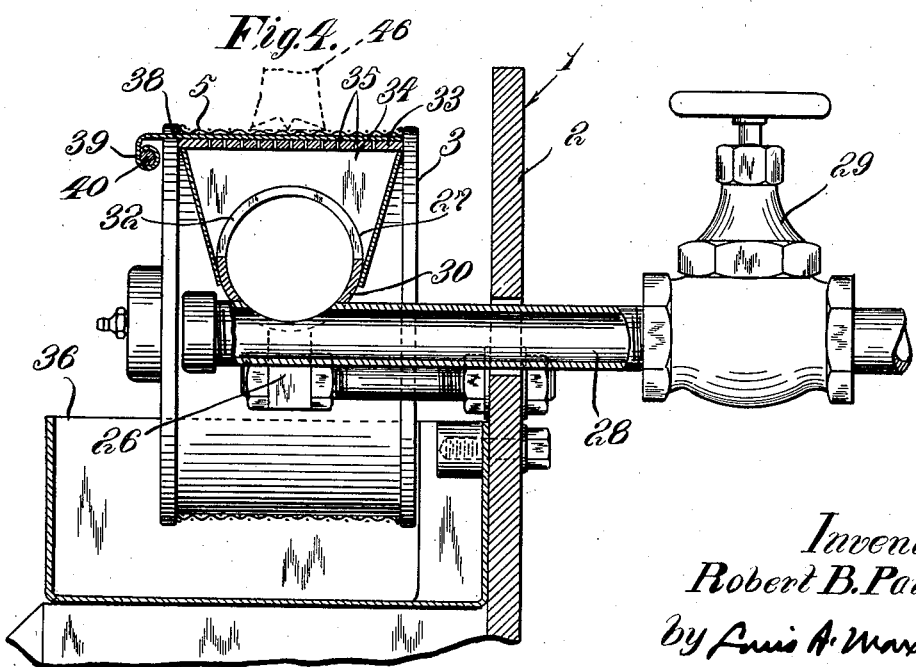
Inventor:
Robert B. Parker.

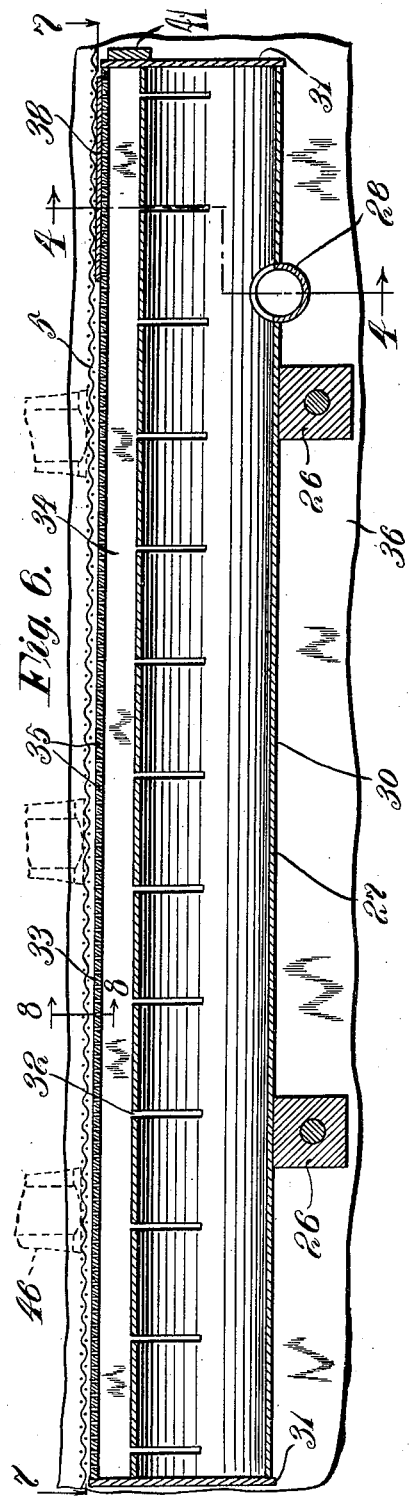
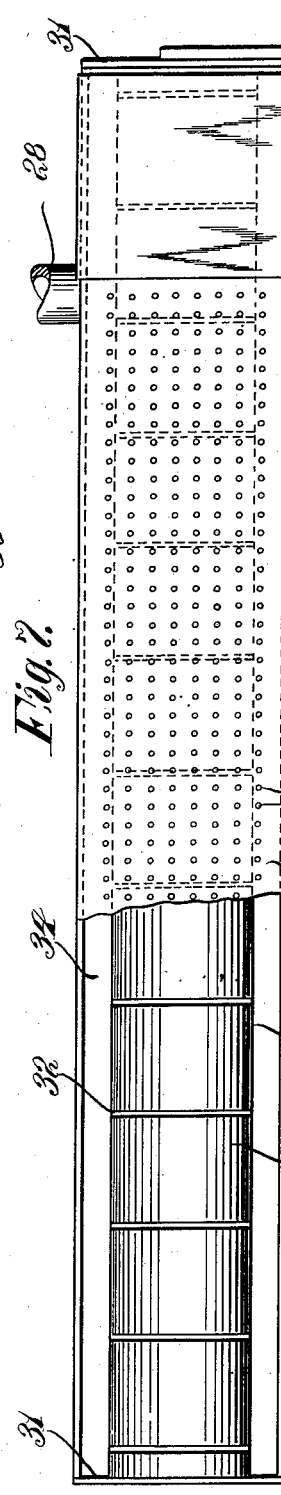

Oct. 29, 1940.  R. B. PARKER  2,219,430
TEMPERING APPARATUS
Filed July 30, 1937  4 Sheets-Sheet 4
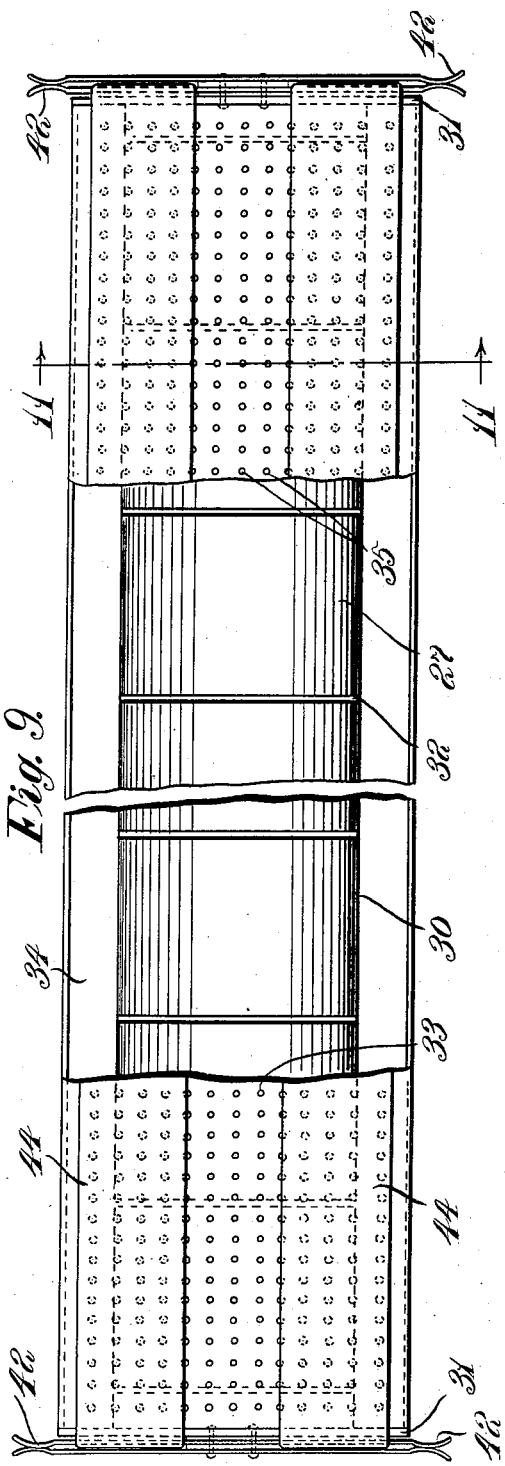
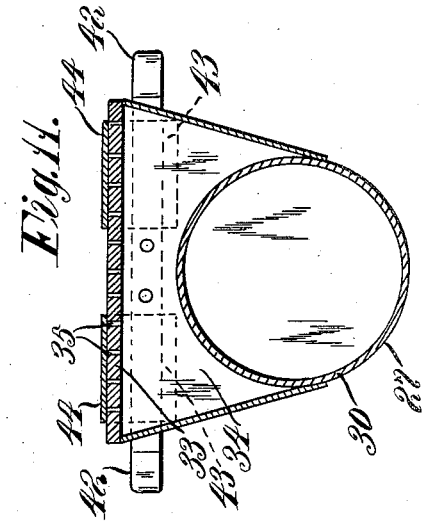
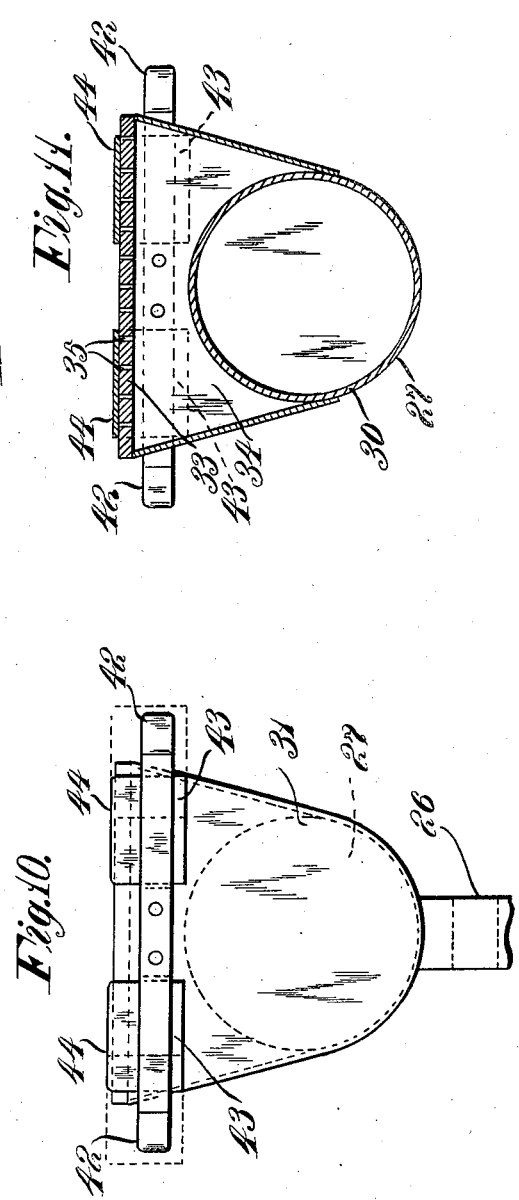
Inventor:
Robert B. Parker Patented Oct. 29, 1940

2,219,430

UNITED STATES PATENT OFFICE 2,219,430

TEMPERING APPARATUS

Robert B. Parker, Claremont, N. H., assignor to Sullivan Machinery Company, a corporation of Massachusetts Application July 30, 1937, Serial No. 156,559

7 Claims. (Cl. 266—6)

This invention relates to apparatus for tempering heated articles, and, while applicable to many articles in general, more particularly to improved apparatus for tempering drill bits used in rock drills.

In the tempering of heated articles, and more particularly in the tempering of rock drill bits or similar cutting tools having cutting portions, it is highly desirable to obtain uniformity in the tempering thereof so that the drill bits or other tools will have cutting portions of equal hardness. It has been found that in certain known types of tempering apparatus, and more particularly in tempering apparatus which involves manual positioning operations of the articles to be tempered, uniformity in the hardness of the cutting portions thereof was practically impossible.

An object of the present invention is to provide an improved tempering apparatus adapted to overcome the deficiencies of known types of apparatus, whereby uniformity in the hardness of the cutting portions of the drill bits or other tools is attained. Another object is to provide an improved tempering apparatus for heated articles whereby the quenching liquid is uniformly and without variation applied to the portions to be tempered of the drill bits or other tools. A further object is to provide an improved tempering apparatus embodying improved liquid delivery means for uniformly applying the quenching liquid to the articles to be tempered. A still further object is to provide, in an apparatus of the above character, improved conveying means for the articles to be tempered, for conveying the articles at a uniform speed with respect to the quenching means. Another object is to provide an improved liquid delivery means for applying the quenching liquid to the articles to be tempered, having embodied therein improved means for uniformly and without variation but with a rapid change of the liquid in contact with the articles, applying the quenching liquid to the portions of the articles to be tempered, together with improved liquid regulating means whereby the amount of liquid applied to the articles may be varied to suit different conditions. These and other objects of the invention will, however, hereinafter more fully appear.

In the accompanying drawings there are shown one embodiment and a modification thereof which the invention may assume in practice.

In these drawings—

Fig. 1 is a top plan view of an illustrative embodiment of the improved tempering apparatus.

Fig. 2 is a side elevational view of the tempering apparatus shown in Fig. 1.

Fig. 3 is an enlarged vertical sectional view taken substantially on line 3—3 of Fig. 2.

Fig. 4 is an enlarged cross sectional view taken substantially on line 4—4 of Figs. 1 and 6.

Fig. 5 is an enlarged detail sectional view taken on line 5—5 of Fig. 1.

Fig. 6 is an enlarged longitudinally extending vertical sectional view taken substantially on line 6—6 of Fig. 1.

Fig. 7 is a horizontal sectional view taken substantially on line 7—7 of Fig. 6, with parts broken away.

Fig. 8 is an enlarged detail cross sectional view taken on line 8—8 of Fig. 6.

Fig. 9 is a view similar to Fig. 7, showing a modified form of construction.

Fig. 10 is an end elevational view of the structure shown in Fig. 9.

Fig. 11 is a cross sectional view taken substantially on line 11—11 of Fig. 9.

In this illustrative construction, there is shown an improved tempering apparatus designated, as an entirety, by the reference character 1, particularly adapted to use in the tempering of the cutting portions of rock drill bits or similar cutting tools, although it will be evident that various features of the invention may be incorporated in apparatus for tempering heated articles of various other forms.

The improved tempering apparatus as shown in Figs. 1 to 8, inclusive, of the drawings, comprises a base frame 2 having supported thereon near the opposite ends of the upper part thereof, rollers or pulleys 3 and 4, the former being a driving pulley and the latter an idler pulley, and these pulleys, in this instance, are journaled for rotation on parallel horizontal axes extending transversely of the base frame. Guided on these rollers or pulleys is an endless conveyor belt 5. This conveyor belt is herein of a flexible reticulated screen-like construction, and is preferably in the form of woven wire mesh. As shown most clearly in Fig. 8, this conveyor belt is formed with rolled edges providing upstanding ledges at the sides of the belt, and these ledge-like edges not only increase the belt strength but also serve in a measure as retaining walls for the quenching liquid, as will later be explained. The driving means for the conveyor driving pulley 3 comprises a motor 6 supported on a shelf-like projection 7 carried by the base frame, and the power shaft 8 of this motor is connected by a coupling 9 to the shaft 10 of a speed reducer 11 of conventional form. The final terminal element 12 of this speed reducer has fixed thereto a sprocket 13 connected by an endless drive chain 14 to a sprocket 15 fixed, as by screws, to the hub 16 of the drive pulley 3. The pulleys 3 and 4 are similarly journaled. As shown most clearly in Fig. 3, the pulley 3 is journaled on bearings supported by a horizontal shaft 17 having a reduced threaded end 18 passing through an opening in the base frame and having a securing nut 19 for firmly clamping the shaft in position on the frame. The shaft of the idler pulley 4 is adjustable so that the belt may be properly tightened, and the adjusting means therefor comprises, as shown in Fig. 5, an adjusting screw 20 passing through an opening in a lug 21 on the base frame and having threaded thereon adjusting and locking nuts 22. The idler pulley shaft is formed with a rectangular portion 23 guided in a longitudinal slot 24 formed in the side of the base frame, and embracing the shaft is an eye portion 25 formed integral with the adjusting screw 20. When the clamping nut 19 on the idler pulley shaft is loosened, the nuts of the adjusting screw may be turned to adjust the screw, thereby moving the pulley shaft within its guide slot into the desired position. The clamping nut of the pulley shaft may be thereafter tightened to lock the pulley in its adjusted position.

Arranged longitudinally beneath the upper run of the conveyor belt 5 between the pulleys and supported by suitable brackets 26, 26 on the base frame is a tank 27 adapted to contain a quenching liquid, preferably water, and having a bottom inlet connection 28 controlled by a valve 29 and leading to any suitable source of water supply. This tank is preferably of cylindric form and comprises a cylindrical shell 30 having end closure plates 31, and the shell is vertically slotted at 32 substantially half-way through, at points along the length of the tank, so that when water under pressure is supplied through the connection 28, the tank acts as a manifold for distributing the water pressure substantially equally throughout the length of the tank. If desired a plurality of water connections may be provided along the length of the tank bottom. Arranged above the tank is a horizontal foraminated plate 33 having its top surface lying closely adjacent the lower surface of the upper run of the conveyor belt, and inclined side closure plates fixed to the sides of the tank and to the plate bottom support the plate on the tank, the side plates cooperating with the top plate to provide an elongated water chamber 34 coextensive with and above the tank. The water flowing from the tank through the vertical slots 32 flows into the top water chamber 34, and the top plate 33 is perforated by numerous openings or foramina 35, so that the water is discharged from the water chamber 34 vertically toward the top run of the conveyor belt in numerous fine solid stream of water. The passages in the tank and the top plate are so formed that a substantially higher water pressure builds up in the tank than in the upper water chamber, and, due to the multiplicity and arrangements of the discharge slots distributed along the length of the tank, the water pressure in the top water chamber is substantially constant throughout its entire length. As a result, the numerous short solid streams of water discharged upwardly from the top water chamber through the perforations or foramina in the top plate, are of substantially equal height. These streams of water flow upwardly, through the interstices in the wire mesh of the conveyor belt, into the path of movement of the articles to be tempered, and are thereby so sub-divided and intermingled that a stratum or layer of water of nearly uniform thickness and rapidly changing identity, so to speak, overlies the top of the upper run of the conveyor belt, so that the articles supported on the conveyor belt are all evenly quenched. As the quenching water flows upwardly through the interstices of the wire-mesh conveyor belt, it is retained at the top of the belt by the ledge-like edges of the belt, and builds up to a substantially even depth and flows from the belt over the side edges thereof. Even when the flow is in such volume that the water stands at a depth substantially greater than the thickness of the belt side edges it forms a layer of nearly even depth. Supported on the base frame and located below the water tank and the conveyor is an elongated pan-like tank 36 for receiving the water draining back subsequent to the quenching operation, and this tank is provided with a suitable drain-pipe connection 37.

Means is provided for regulating the operation of the quenching means, comprising an imperforate plate 38 interposed between the upper surface of the top plate 33 and the bottom surface of the upper run of the conveyor belt, in the manner shown in Fig. 6, and this plate is provided with a downwardly bent portion 39 slidably engaging a longitudinal guide rod 40. This guide rod is secured to a supporting plate 41 fixed to the adjacent end closure plate 31 of the water tank, in the manner shown in Fig. 7. The plate 38 may be manually moved along the guide rod 40 into the desired position, and in certain conditions, additional plates may be inserted on the guide rod, or the plate 38 may be removed so that the number of active perforations in the top plate may be varied, thereby to vary the duration of the quenching of the articles on the conveyor belt. It will be evident that if desired an elongated plate of substantially the same or even greater length than the guide rod may be inserted between the top plate and the upper run of the conveyor.

In Figs. 9, 10 and 11, a modified form of means for regulating the amount of liquid discharged upwardly through the top plate of the quenching means, is shown. In this instance, the plate 38 and guide rod are omitted, and secured to the opposite ends of the water tank are spring clips 42 adapted to receive the downwardly bent ends or angular portions 43 of a pair of parallel guide plates or bars 44. These pairs of plates not only act as guides for the upper run of the conveyor belt 5, but are also adjustable laterally within the spring clips toward and from one another to vary the width of the space therebetween, and as a result, the number of active holes in the top plate may be increased or decreased as conditions require. The spring clips hold the guide plates in adjusted position.

The improved tempering apparatus is used in conjunction with a heating furnace of the automatic type wherein the articles to be tempered are automatically moved, by suitable means, through the heating chamber of the furnace and discharged, when properly heated, along a horizontal discharge chute or slide 45, indicated in construction lines in Fig. 3. The articles to be tempered, herein the rock drill bits indicated at 46, are discharged from the furnace in a position with the bits lying on their sides, and as the bits move toward the end of the chute the end bit tips over into an upright endwise position onto the conveyor belt 5. The position that the heated drill bits assume on the conveyor belt is shown in Figs. 4 and 6. As the bits are moved by the conveyor from above the water tank at the end of the quenching operation, they are discharged from the apparatus through a discharge chute 49 supported at one end of the base frame.

The general mode of operation of the improved tempering apparatus will be clearly apparent from the description given. As the heated drill bits are discharged from the heating furnace, they are deposited upon the conveyor belt 5 of the tempering apparatus, in the position shown in Figs. 4 and 6. When the valve 29 is opened to supply water under pressure through the supply connection 28 of the tank 27, the water flows throughout the length of and completely fills the tank and then flows in numerous streams vertically through the vertical slots 32 into the elongated water chamber 34. As the pressure builds up within the water chamber 34, the water is discharged therefrom through the perforations or foramina 35 in a multitude of comparatively low, solid streams. The subdivision of these streams by the belt-screen, their subsequent merging, the supply of liquid at a rate greater than lateral discharge will carry off without the building up of a solid layer or sheet of water, and the great multitude of streams at low head, further mingled by passing through the belt-screen and the water sheet, produce a stratum or layer of water of nearly uniform depth and of very rapidly changing constitution. As the conveyor belt is slowly driven by the motor 6 through the speed reducer 11, the heated drill bits are moved along with their working faces submerged to the desired depth and with continuously changing water supply directly to their forward surfaces so that the cutting portions of the bits are uniformly quenched. Of course the depth of submergence, and also the rate of water circulation, so to speak, may be closely controlled and widely varied by the adjustment of the valve 29. The tempered bits are discharged from the conveyor belt through the inclined discharge chute 49. By adjusting the plate 38, or by providing additional plates, the number of active perforations or foramina 35 in the top plate may be varied so that the degree of tempering of the drill bits may be regulated. The mode of operation of the modification shown in Figs. 9, 10 and 11, is the same as that above described with the exception that when it is desired to regulate the number of active perforations in the top plate to regulate the water depth, the guide bars 44, 44 may be moved back and forth to vary the width of the space therebetween.

As a result of this invention, it will be noted that an improved tempering apparatus is provided for heated articles, such as rock drill bits or similar cutting tools, whereby the quenching liquid may be uniformly and without variation applied to the portions to be tempered of the bits or tools. It will further be noted that by the provision of the improved quenching-bath-forming means for applying the quenching liquid onto the articles to be tempered, together with the improved conveying means for moving the articles to be tempered while undergoing quenching, the quenching liquid is uniformly applied directly to the desired portions of the articles to be tempered. It will further be evident that by the provision of the regulating means associated with the liquid supply means, the amount of liquid—i. e., its depth and its quantity—brought into quenching contact with the articles may be varied to suit different conditions. It will be noted, moreover, that a laterally flowing shallow stream of quenching liquid is provided through which, transversely to the direction of flow of such stream, the bits are moved during quenching.

Other uses and advantages of the improved tempering apparatus will be clearly apparent to those skilled in the art.

While there are in this application specifically described one form and a modification which the invention may assume in practice, it will be understood that the form and modification thereof are shown for purposes of illustration and that the invention may be further modified and embodied in various other forms without departing from its spirit or the scope of the appended claims.

What I claim as new and desire to secure by Letters Patent is:

1. In a tempering apparatus, means for supporting a series of articles to be tempered and moving them in a predetermined path, and means for flowing a quenching medium endwise onto, and then transversely of the path of, the portions to be tempered of the articles.

2. In a tempering apparatus, a reticulated conveyor belt for supporting and moving a series of heated articles to be tempered, and means for substantially uniformly delivering a liquid through the interstices of the conveyor belt into, and then transversely of, the path of movement of the articles along that portion of travel during which quenching takes place.

3. In a tempering apparatus, a reticulated conveyor belt for moving a series of heated articles to be tempered in a predetermined path, a liquid tank arranged beneath and extending substantially the full length of the upper run of said conveyor belt, means for supplying a liquid under pressure to said tank, means for uniformly discharging the liquid from said tank in the form of a multiplicity of closely spaced uniform streams along its full length perpendicular to said conveyor belt and through the interstices of the conveyor belt into the path of movement of the articles, and means for varying the length of the portion of said conveyor belt through which liquid is discharged.

4. In a tempering apparatus, and endless reticulated conveyor for supporting and moving a series of heated articles to be tempered, a foraminated plate below the upper run of said conveyor and having its openings closely and evenly spaced, means for uniformly discharging a quenching liquid through the plate foramina and the interstices in the conveyor into the path of movement of the articles along a substantial length of the upper run of said conveyor, and manually adjustable means for varying the length of the portion of the conveyor through which liquid is discharged.

5. In a tempering apparatus, an endless reticulated conveyor for supporting and moving a series of articles to be tempered, a water tank supported longitudinally beneath the upper run of said conveyor, said tank having a series of top discharge openings distributed at points along the length thereof, means coextensive with said tank providing a water chamber with which said series of discharge openings communicate, a foraminated plate closing the top of said chamber and closely underlying the upper run of said conveyor, the water discharging from said chamber upwardly through said plate foramina and through the interstices in said conveyor into the path of movement of the articles to be tempered, and adjustable means for controlling the flow through the interstices in said conveyor without varying the flow through said plate foramina.

6. In a tempering apparatus, a reticulated conveyor having a horizontal portion for supporting a series of heated articles to be tempered, a liquid tank disposed longitudinally beneath said horizontal portion of said conveyor and having a foraminated top plate closely underlying said horizontal conveyor portion, means for discharging upwardly through the foramina in the plate and the interstices in the conveyor a multiplicity of streams of quenching liquid, and means disposed between said plate and said conveyor for regulating the flow of liquid through said conveyor interstices.

7. In a tempering apparatus, a reticulated conveyor for supporting a series of heated articles to be tempered, a liquid tank disposed longitudinally beneath said conveyor and having a foraminated top plate closely underlying said conveyor, means for discharging upwardly through the foramina in the plate and the interstices in the conveyor a multiplicity of streams of quenching liquid, and an adjustable plate disposed between said foraminated plate and conveyor and adjustable relative to said foraminated plate and conveyor for regulating the flow of liquid through said conveyor interstices.

ROBERT B. PARKER.

CERTIFICATE OF CORRECTION.

Patent No. 2,219,430.                                October 29, 1940.

ROBERT B. PARKER.

It is hereby certified that error appears in the printed specification of the above numbered patent requiring correction as follows: Page 2, first column, line 64, for "stream" read --streams--; page 3, second column, line 51, claim 4, for "and" read --an--; and that the said Letters Patent should be read with this correction therein that the same may conform to the record of the case in the Patent Office.

Signed and sealed this 17th day of December, A. D. 1940.

Henry Van Arsdale,
Acting Commissioner of Patents.

(Seal)